United States Patent [19]

Matsuda et al.

[11] Patent Number: 4,529,310
[45] Date of Patent: Jul. 16, 1985

[54] DEVICE FOR DETECTION OF CENTER OF ROTATION OF ROTATING OBJECT

[75] Inventors: Kiyofumi Matsuda; Tomoaki Eiju; Yuji Enomoto, all of Ibaraki; Yoshitaro Yoshida, Chiba, all of Japan

[73] Assignees: Agency of Industrial Science & Technology; Ministry of International Trade & Industry, both of Tokyo, Japan

[21] Appl. No.: 424,629

[22] Filed: Sep. 27, 1982

[30] Foreign Application Priority Data

Dec. 17, 1981 [JP]  Japan .............................. 56-204260
Mar. 30, 1982 [JP]  Japan .............................. 57-51581

[51] Int. Cl.$^3$ .............................................. G01B 9/02
[52] U.S. Cl. ...................................... 356/349; 356/363
[58] Field of Search ............... 356/345, 349, 363, 28, 356/28.5

[56] References Cited

U.S. PATENT DOCUMENTS

3,915,576  10/1975  Taylor ........................... 356/354 X
4,397,550  8/1983   Matsuda et al. .............. 356/349 X

Primary Examiner—Davis L. Willis
Assistant Examiner—Matthew W. Koren
Attorney, Agent, or Firm—Schwartz & Weinrieb

[57] ABSTRACT

A device for the detection of the center of rotation of a rotating object under test comprises means for illuminating a laser beam on at least one position on the surface of the object thereby generating an interference fringe, means for subjecting the resultant reflected scattered laser beams to spectral analysis by the laser Doppler effect thereby finding the velocity of rotation of the position at which the interference fringe is formed on the surface, and means for determining the center of rotation on the basis of the velocity so found. Protection of the spectral analysis from the adverse effect of the pedestal component is accomplished by causing interference fringes to be formed at a plurality of positions on the surface of the object under test or by placing in the optical path for one of the pair of laser beams a prism capable of continuously modulating the laser frequency.

21 Claims, 28 Drawing Figures

Fig_1

Fig_2

Fig_5

Fig_7

Fig_10

Fig_11

Fig_8 (A)

Fig_8 (B)

Fig_14

Fig_15

Fig_16

Fig_19

DEVICE FOR DETECTION OF CENTER OF ROTATION OF ROTATING OBJECT

FIELD OF THE INVENTION

This invention relates to a device for the detection of the center of rotation of a rotating object by utilizing the laser Doppler effect.

BACKGROUND OF THE INVENTION

The desirability of a device capable of detecting the center of rotation of a rotating object is frequently felt and urged in numerous industries and various branches of the science of measurement. Particularly in the operation of precision machining by the use of a lathe, for example, the detection of the center of rotation of the worked surface of a rotating workpiece constitutes one of the essential tasks indispensable to the machining operation. The critically precise finishing generally accomplished by rotating the workpiece about its axis and advancing a cutting tool such as a diamond tool secured on the cutter holder of a lathe from the periphery of the workpiece toward the center of rotation thereof. If, in this case, the center of rotation of the workpiece is not accurately known, there may occur a portion around the axis of the workpiece which escapes being cut by the tool. To avoid this situation, the lathe operator makes a point of aligning the tip of the tool to the dead center before starting the operation of the lathe and, thereafter, advancing the tool from the periphery of the workpiece toward the center of rotation all over again. This job requires advanced skill and consumes much time.

One conceivable practical method for effecting automatic detection of the center of rotation of a rotating object may comprise sequentially detecting the center of rotation of the workpiece during the process of machining and feeding the results of detection back to the control system which serves to drive the tool or other cutting edge. Actually, however, there has not yet been developed a device which is capable of effecting such an automatic detection of the center of rotation of a rotating object as described above.

This invention has originated in the conception of an idea of utilizing the laser Doppler effect capable of measuring with high accuracy the velocity of rotation of a moving object to the detection of the center of rotation of a rotating object. To be more specific, since the center of rotation of a rotating object produces no movement, the detection of this center of rotation ought to be accomplished by illuminating the rotating object with laser beams and, from among the reflected laser beams, singling out the laser beam which has been free from the Doppler shift. The point at which the surface of the rotating object has reflected this particular laser beam undergoing no Doppler shift is the center of rotation in question. To meet the demand for more speedy detection of the center of rotation and for further simplification of measurement, however, the present approach has many problems yet to be solved. Worse still, since the laser beam which is reflected at the center of rotation of the rotating object is not subject to the Doppler shift, the reflected signal which has undergone a minute shift or absolutely no shift completely overlaps the pedestal component which inevitably appears as a noise component on the power spectrum, making it impossible to measure the amount of shift. Because of these difficulties, no success has yet been achieved in the application of the principle of the laser Doppler effect to the detection of the center of rotation of a rotating object.

OBJECT OF THE INVENTION

An object of the present invention is to provide a device for the detection of the center of rotation of a rotating object, which is capable of detecting the center of rotation on the surface of the rotating object highly accurately and simply by the use of the principle of laser Doppler effect.

SUMMARY OF THE INVENTION

To accomplish the object described above according to this invention, there is provided a device for the detection of the center of rotation of a rotating object, which comprises an interference fringe generating unit for producing an interference fringe at one or more focal points by the use of laser beams from a laser, a microscope for illuminating the interference fringe on the surface of the rotating object under test and delivering as an output thereof the light scattered by the surface of the object, and an interference fringe measuring unit for converting the optical signals of the scattered light delivered by the microscope into electric signals and, through analysis of the electric signals, determining the velocity of rotation of the object.

When paired laser beams are illuminated at different angles on at least one point on the surface of a rotating object under test, the laser beams are scattered by the microscopically rough surface. Because of the Doppler effect, the scattered light undergoes frequency modulation, that is, the Doppler shift. Consequently, the center of rotation of the rotating object can be determined by detecting the Doppler beat frequency obtained by the scattered light thus undergoing the Doppler shift and analyzing the beat frequency with a spectrum analyzer. The true center of rotation of the rotating object can be confirmed by the fact that when the interference fringe produced from the pair of laser beams illuminated on the surface of the rotating object impinges upon the center of rotation of this rotating object, the velocity of rotation at the point of incidence becomes zero and, consequently, the Doppler beat frequency at the same point of incidence also becomes zero. In this case, however, the beat frequency component of the scattered laser beams obtained at and near the center of rotation of the rotating object under test defies successful spectral analysis because the beat frequency approaches or even overlaps the pedestral component on the power spectrum. The present invention, therefore, avoids the effect of the pedestral component upon the spectral analysis and, better still, simplifies the measurement of interference fringes by using a plurality of paired laser beams for thereby forming two or more interference fringes on the surface of the rotating object under test. Another measure adopted by this invention for eliminating the adverse effect of the pedestral component consists in incorporating in the optical path for one of the pair of laser beams a prism adapted to be moved for continuously modulating the beam frequency, whereby the desired beat signals are separated from the pedestral component in the power spectrum in order for the detection of the center rotation of the rotating object to be carried out without interruption from the pedestral component.

BRIEF DESCRIPTION OF THE DRAWINGS

The other objects and features of the present invention will become apparent from the detailed description of the invention to be made hereinafter with reference to the accompanying drawing, wherein.

DESCRIPTION OF THE PREFERRED EMBODIMENTS

Figure 1:
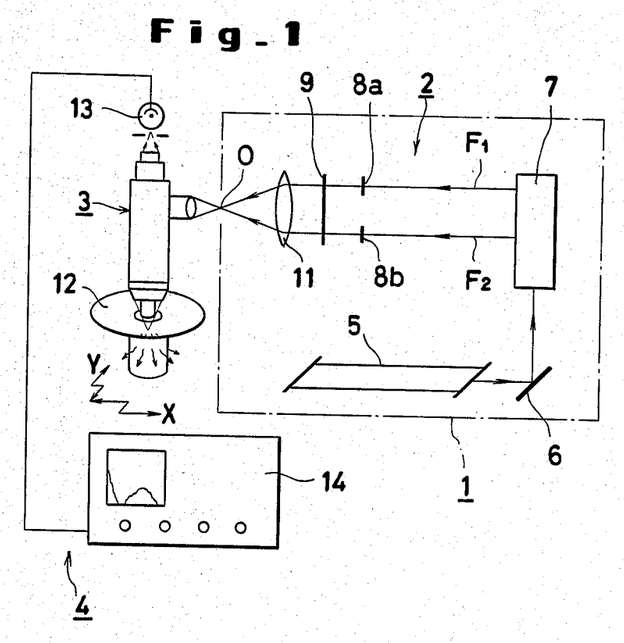
FIG. 1 is an explanatory diagram of the construction of a device for the detection of the center of rotation of a rotating object, involved in one embodiment of the present invention.

FIG. 1 is a schematic diagram illustrating the basic construction of a device for the detection of the center of rotation of a rotating object as one embodiment of the present invention. This device for the detection of the center of rotation comprises an interference fringe generating unit 1, a microscope 3, and an interference fringe measuring unit 4. In the present embodiment, the interference fringe generating unit 1 is composed of a laser 5 and an optical system 2 which, as enumerated in the order falling in the course of the laser beam emanating from the laser 5, consists of a mirror 6, a beam splitter 7, a pair of polarizers 8a, 8b, one more polarizer 9, and a condenser 11. The two polarizers 8a, 8b are intended for equalizing the luminous energies of the beams $F_1$, $F_2$ issuing from the beam splitter 7 and the other polarizer 9 is for equalizing different states on polarization produced in the beams $F_1$, $F_2$ owing to the use of the polarizers 8a, 8b. These elements are not necessarily components indispensable to the construction of the present invention. They may be substituted by other desired optical components on the condition that they are capable of producing laser beams of uniform characteristics.

The microscope 3 is disposed so that the object lens thereof is directly opposed to the surface 12 of an object under test. The surface 12 of the object is a finished surface of a workpiece. Generally, this workpiece is rotated as held fast such as with a lathe chuck. The device illustrated is a version used for model test and the object under test is made of ground glass.

The laser beam emanating from the laser 5 is reflected by the mirror 6 and injected into the beam splitter 7, there to be split into two beams $F_1$, $F_2$. The beam $F_1$ has its luminous energy adjusted first by the polarizer 8a and then by the polarizer 9 and passed through the condenser 11 to be converged at a focal point 0. The other beam $F_2$ has its luminous energy adjusted first by the polarizer 8b and then by the polarizer 9 and passed through the condenser 11 to be converged at the focal point 0. Consequently, the two beams $F_1$, $F_2$ coincide with each other at the focal point 0 to give rise to an interference fringe.

The interference fringe thus produced at the focal point 0 is passed through the microscope 3 and illuminated on the surface 12 of the object under test. By the microscopically rough plane of the surface 12 of the moving object kept in rotation, the impinging interference fringe is scattered. The scattered light is again passed through the microscope 3 and delivered out of the eyepiece thereof as an output. The output light is caught by a photoelectric element 13, which converts the incoming optical signals into corresponding electric signals and forwards the electric signals to a spectrum analyzer 14. The spectrum analyzer 14 produces a power spectrum of the scattered light which have undergone Doppler shift owing to the movement of the surface 12 under test, performs either frequency analysis or auto-correlation processing on the power spectrum to find beat frequencies, and acquires speed data from the central frequency.

Figure 2:
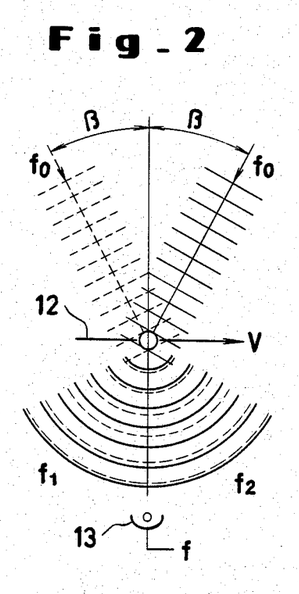
FIG. 2 is an explanatory diagram illustrating the illuminating light and the scattering characteristic thereof.

On the assumption that the beams of frequencies $f_1$, $f_2$ impinge upon a measuring point on the surface 12 of the object under test in the respective directions of $(\pi/2)-\beta$ and $(\pi/2)+\beta$ relative to the direction of the movement of the object as illustrated in FIG. 2, the frequencies $f_1$, $f_2$ are expressed as follows.

$$f_1 = f_0\{1+(V\cdot\sin\beta/\lambda)\}$$

$$f_2 = f_0\{1-(V\cdot\sin\beta/\lambda)\}$$

and the Doppler beat frequency f indicated on the two beam differential type laser Doppler velocimeter is expressed as follows.

$$f = |f_1 - f_2| = (2V\cdot\sin\beta)/\lambda$$

wherein, V denotes the velocity of movement of the measuring point, and $\lambda$ the wavelength.

Figure 3:
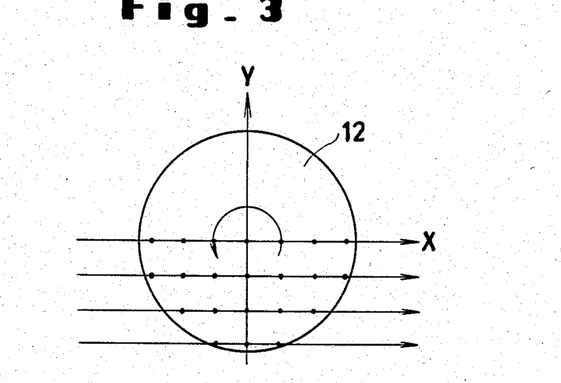
FIG. 3 is an explanatory diagram illustrating the positions of measurement on the surface of a rotating object under test.

The velocity V of the measuring point, therefore, can be determined by analyzing the frequency f. Consequently, the center of rotation of the surface 12 of the object can be determined by finding the point where the velocity V is zero. The detection of the point satisfying the relation V=0 is accomplished by carrying out the measurement of interference fringes at a plurality of freely selected points in the X direction and at a plurality of freely selected points in the Y direction on the surface 12 of the object as illustrated in FIG. 3.

Figure 5:
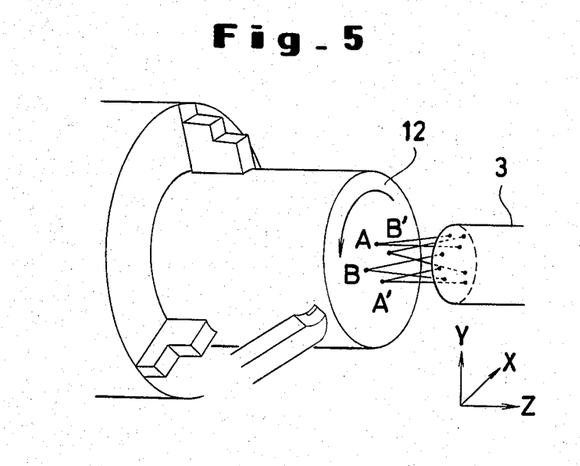
FIG. 5 is a perspective view illustrating the positions for the formation of interference fringes in another embodiment of the present invention.
Figure 6:
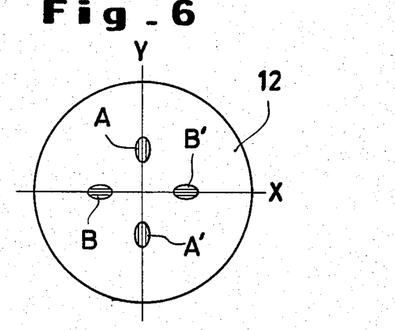
FIG. 6 is a front explanatory diagram illustrating the positions for the formation of interference fringes in FIG. 5.

Any power spectrum obtained of scattered light which has undergone Doppler shift invariably contains a pedestal component in the lower frequency zone below 200 Hz. When the movement of the rotating object under test proceeds at a low speed, part or the whole of Doppler frequency overlaps the pedestal component. In the measurement of the velocity of rotation which is directed to finding the point of zero movement as contemplated by the present invention, the Doppler frequency $\Delta f$ at the point of zero movement is completely buried in the pedestal component P, making it impossible to discriminate the Doppler frequency from the pedestal component. In one preferred embodiment, the center of rotation of a rotating object can be determined by a procedure of effecting formation of interference fringes at a plurality of points on the surface 12 of the object under test as illustrated in FIG. 5 and FIG. 6 and finding the center of rotation on the basis of the data on velocity obtained at the plurality of points. According to this method, the center of rotation of the rotating object under test can be easily obtained without being affected by the pedestal component. Besides, this method obviates the necessity for using numerous points of measurement as illustrated in FIG. 3. Thus, this method has an advantage that the measurement can be simplified.

Figure 7:
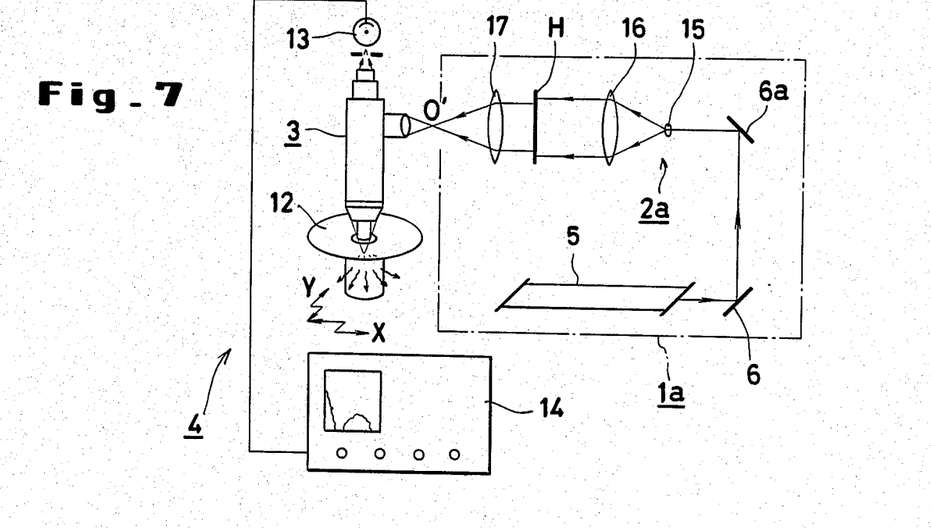
FIG. 7 is an explanatory diagram illustrating the construction of a device for the detection of the center of rotation of a rotating object, involved in still another embodiment of the present invention.

In this embodiment, the interference fringe generating unit is adapted so that four interference fringes are produced at four points A, A', B and B' on the X and Y coordinate axes on the surface 12 of the object under test. When the four interference fringes are formed simultaneously at the points A, A', B and B' on the surface 12 of the object under test as described above, the measurement of the interference fringes ought to determine the point at which the velocities at the points B, B' on the X axis are equalized to each other and those at the points A, A' on the Y axis are equalized to each other. A point at which the straight line connecting the points A, A' and the straight line connecting the points B, B' intersect each other can be determined as the center of rotation of the surface 12 of the object under test. For the formation of these interference fringes at A, A', B and B', the laser beam must be split into as many beams as are necessary and the splitting of the beam calls for a beam splitter capable of splitting the laser beam into a multiplicity of beams. This beam splitter may be formed of a hologram obtained by multiple exposure. By the adoption of such a hologram, the construction of the interference fringe generating unit can be simplified. FIG. 7 illustrates a device for the detection of the center of rotation as involved in a further embodiment of the present invention. In this device for the detection of the center of rotation, the interference fringe generating unit 1 is composed of a laser 5 and an optical system 2a which, as enumerated in the order falling in the direction of the laser beam emanating from the laser 5, consists of a mirror 6, a mirror 6a, a lens 15, a lens 16, a hologram H, and a lens 17. The lenses 15, 16 form a beam expander. The laser beam is expanded into parallel beams by the beam expander and used for illuminating the hologram H. From the hologram H, a plurality of object beams are reconstructed, passed through the lens 17, and converged to the focal point 0' to produce an interference fringe.

Figure 8A:
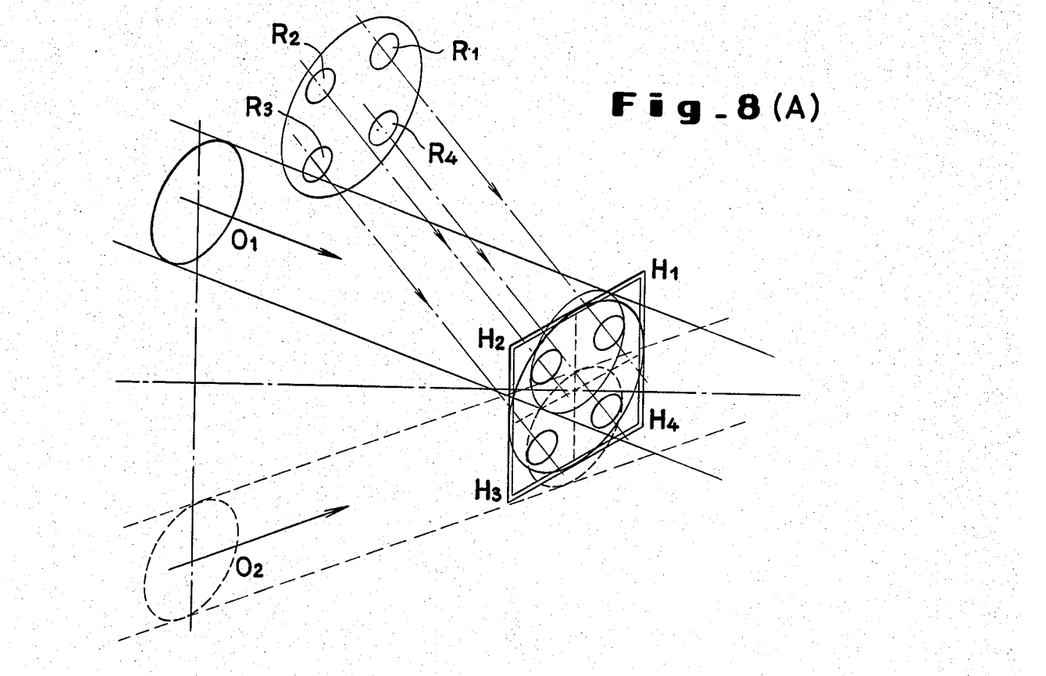
FIGS. 8(A) and 8(B) are explanatory diagrams illustrating a procedure for the preparation of a multiple exposure hologram to be used in the device of FIG. 7.
Figure 8B:
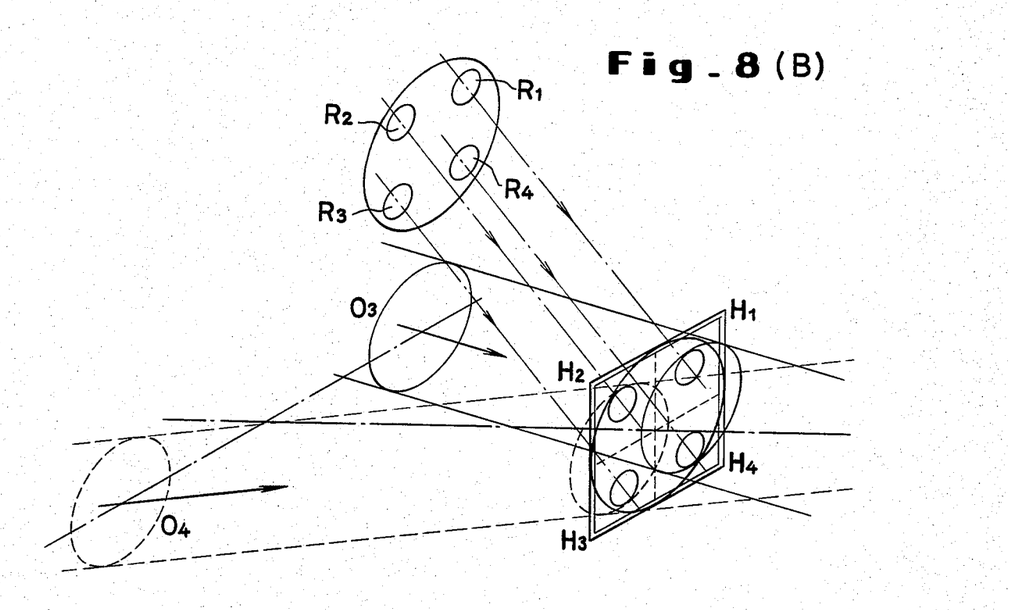

When the center of rotation is determined by projecting a plurality of interference fringes by the use of a multiplicity of beams on the surface of the object under test, the scattered light from each interference fringe may be caught by only one photoelectric element 13. Two photoelectric elements may be used to measure each of the paired interference fringes. Alternatively four interference fringes may be measured one each by four independent photoelectric elements. The hologram H which functions as a multi-beam splitter is prepared as follows. As illustrated in FIGS. 8(A) and 8(B), four object beams $O_1$ to $O_4$ of parallel beams advancing in different directions are recorded on a hologram H by means of four parallel reference beams $R_1$ through $R_4$. In this case, the hologram is divided into small regions which independently record the object beams on each. Naturally, all the object beams can be recorded at once on the entire surface of the hologram. To ensure contrast and prevent undesirable mutual interference of the object beams, the hologram is divided into the smaller regions as described above.

Now, the procedure for the preparation of the hologram will be described below.

(1) First, the object beam $O_1$ is recorded by the reference beams $R_1$, $R_2$ in the regions $H_1$, $H_2$ of the hologram (FIG. 8(A)). The reference beam $R_1$ illuminates the region $H_1$ and the reference beam $R_2$ illuminates the region $H_2$ while the object beam $O_1$ illuminates both the regions $H_1$, $H_2$.

(2) Similarly, the object beam $O_2$ is recorded by the reference beams $R_3$, $R_4$ in the regions $H_3$, $H_4$ of the hologram.

(3) Then, the central beams of the object beams $O_3$, $O_4$ are placed in a plane perpendicular to the plane containing the central beams of the object beams $O_1$, $O_2$ as illustrated in FIG. 8(B).

(4) Similarly, the object beam $O_3$ is recorded in the regions $H_1$, $H_4$ of the hologram by the reference beams $R_1$, $R_4$.

(5) The object beam $O_4$ is recorded by the reference beams $R_2$, $R_3$ in the regions $H_2$, $H_3$.

Figure 9:
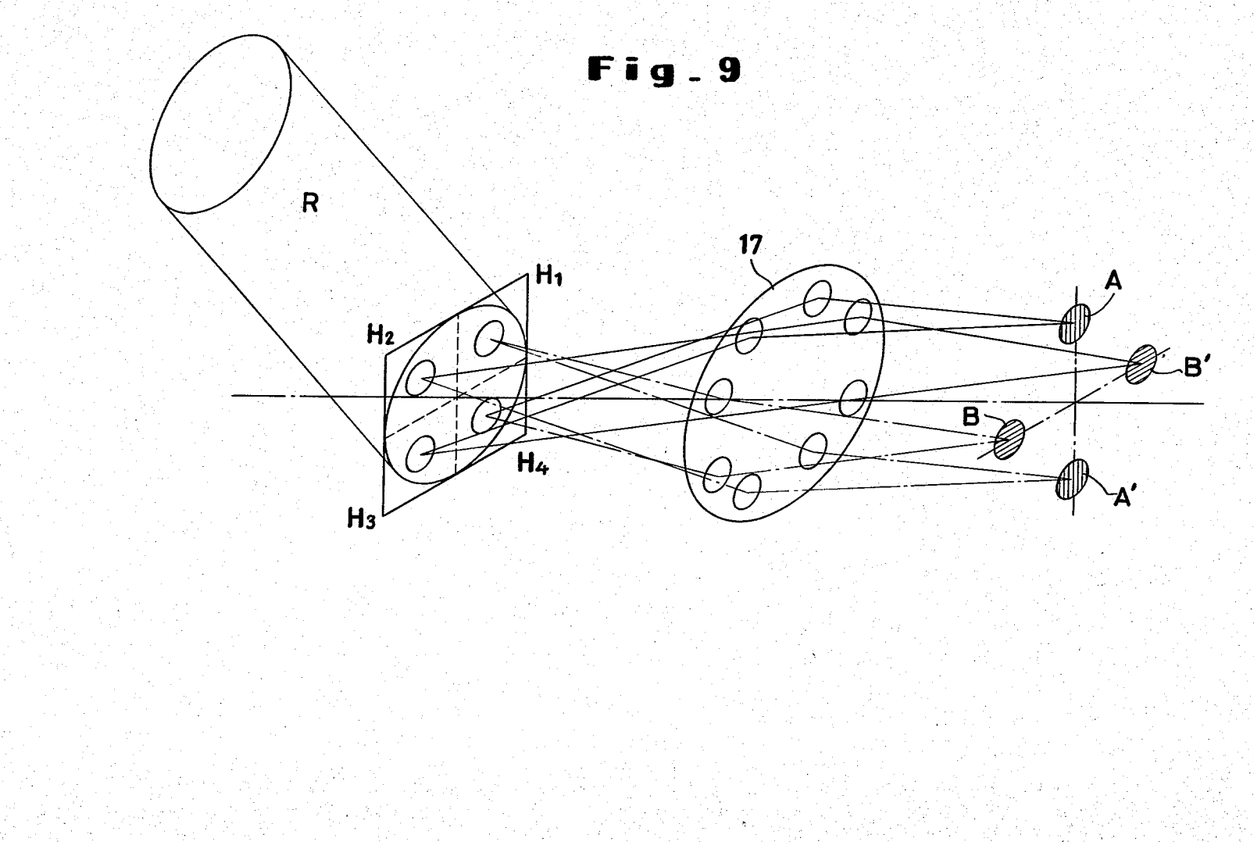
FIG. 9 is an explanatory diagram illustrating a procedure for the reconstruction of a multiple exposure hologram.

By the procedure just described, the object beams $O_1$, $O_3$ have been recorded in the region $H_1$, the object beams $O_1$, $O_4$ in the region $H_2$, the object beams $O_2$, $O_4$ in the region $H_3$, and the object beams $O_2$, $O_3$ in the region $H_4$ respectively. Reconstruction of the recorded object beams is accomplished, as illustrated in FIG. 9, by illuminating on the hologram H a reference beam R wide enough to embrace all the reference beams $R_1$ through $R_4$. As a result, the object beams $O_1$ through $O_4$ are reconstructed from the hologram H. Since each object beam has been recorded in the hologram by two reference beams, two parallel beams are reconstructed. This means that from the hologram H, four pairs of parallel beams can be reconstructed.

Figure 10:
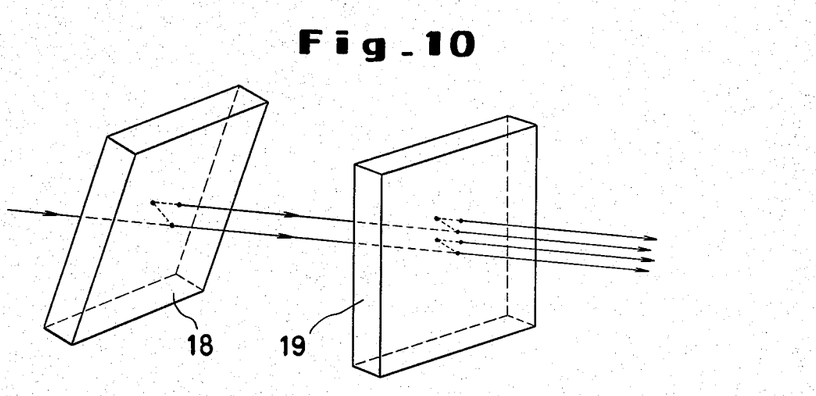
FIG. 10 and FIG. 11 are explanatory diagrams of embodiments each for dividing one laser beam into a plurality of beams.
Figure 11:
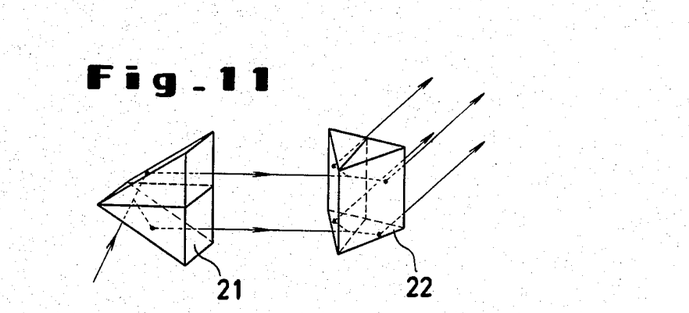
Figure 12:
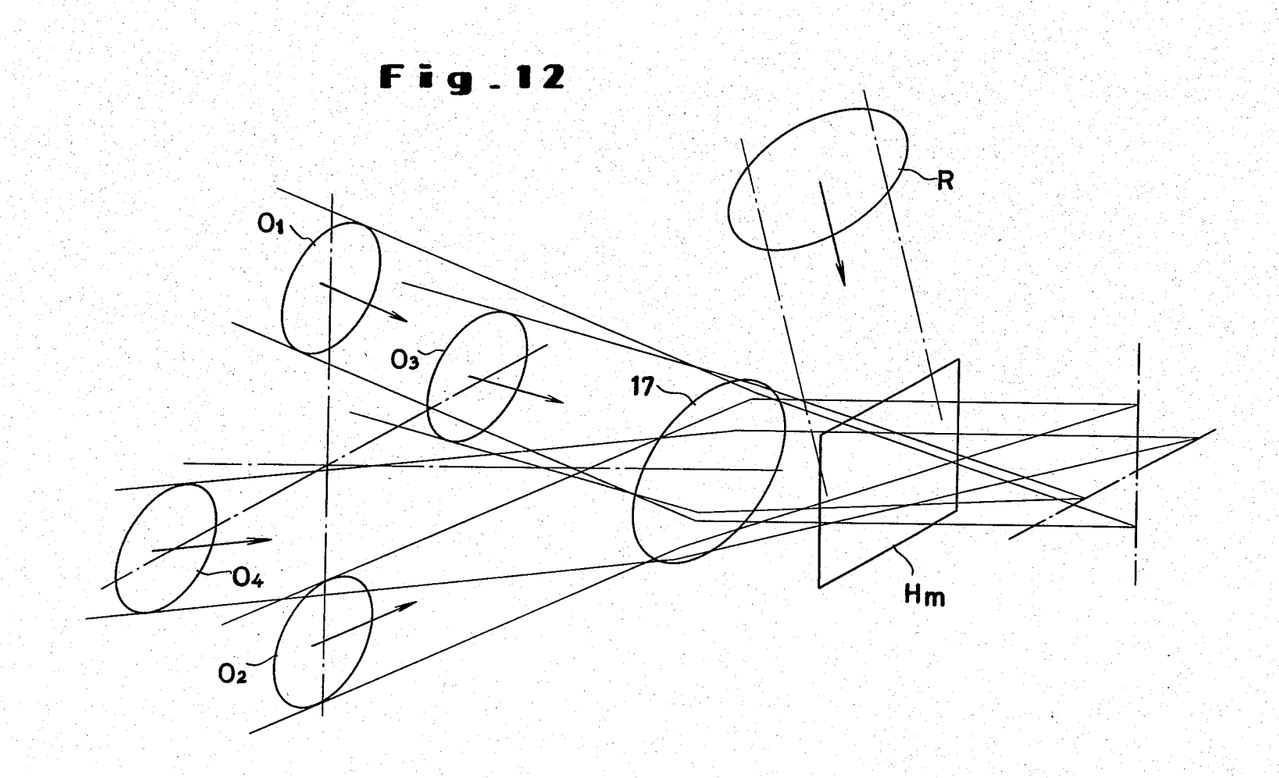
FIG. 12 and FIG. 13 are explanatory diagrams each illustrating procedure for the preparation of a hologram recorded inclusive of a lens effect.

When a lens 17 is disposed behind the hologram, one pair of parallel beams are converged into one point at the focal point of the lens to give rise to an interference fringe. Since there are four pairs of parallel light beams, there can be formed interference fringes one each at four points. When one reference beam is to be split into four beams, there may be used two plates 18, 19 disposed parallel to each other, each being of a flat surface as illustrated in FIG. 10, with one of the plates, 18, adapted to be inclined in the longitudinal direction and the other plate 19 adapted to be inclined in the lateral direction. Alternatively, there may be used two Koester prisms 21, 22 as illustrated in FIG. 11. Optionally the lens 17 may be omitted by causing the action of the lens 17 to be recorded simultaneously with the beams on the hologram. In this case, the preparation of the hologram $H_m$ is effected by carrying out the recording of the hologram $H_m$ behind the lens 17 as seen in FIG. 12. The hologram $H_m$ thus prepared is used in the place of the hologram H. Otherwise, the reconstructed beams from the hologram H may be passed through the lens 17 and recorded on the hologram $H_m$ by the use of other reference beam and the hologram $H_m$ consequently produced is used in the place of the hologram H.

Figure 14:
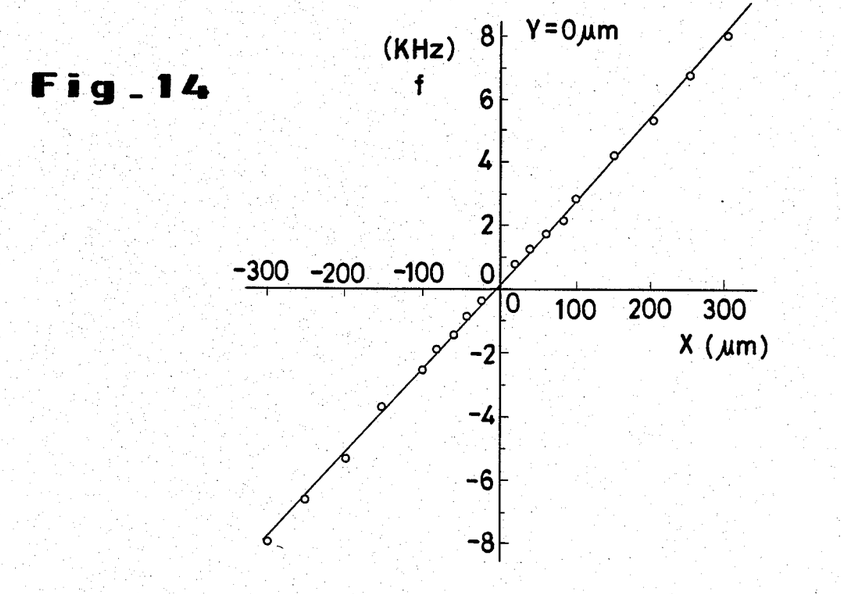
FIG. 14 and FIG. 15 are graphs showing the results of measurement.
Figure 15:
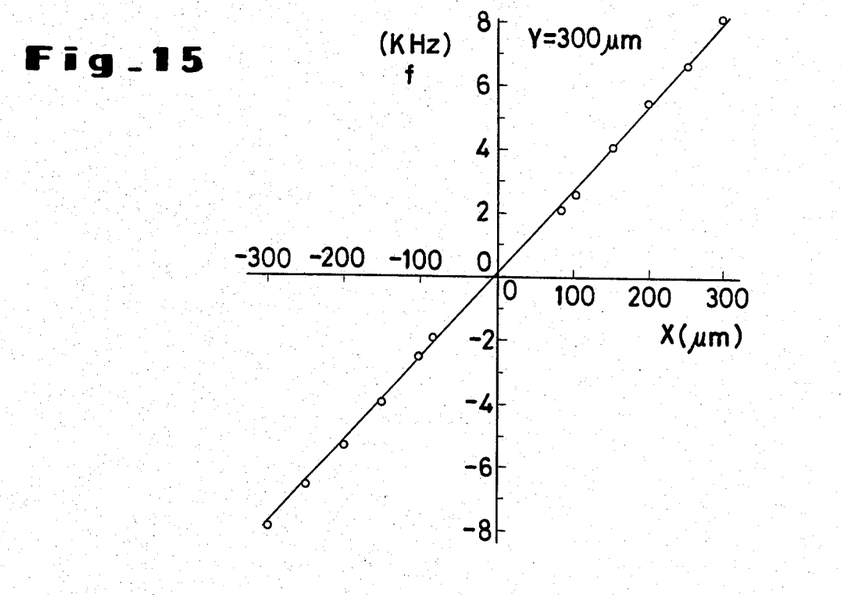

FIG. 14 and FIG. 15 represent graphs showing the results obtained by scanning, in the direction of the X axis, the positions $Y=0$ $\mu$m and $Y=300$ $\mu$m, on the surface of the object under test in accordance with the procedure of measurement indicated in FIG. 3. The graphs clearly indicate that the distances in the direction of the X axis and the magnitudes of Doppler beat frequency f are well proportionated enough to permit accurate detection of the point satisfying $f=0$, that is, the center of rotation.

The following embodiment concerns a device which provides effective detection of the center of rotation of a rotating object without being affected by the pedestal component in the power spectrum. This embodiment will be described below with reference to FIG. 16.

Figure 16:
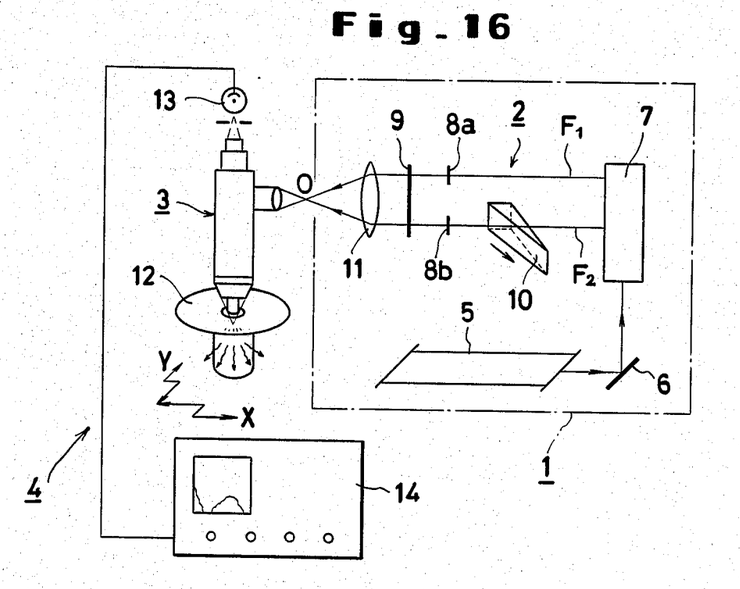
FIG. 16 is an explanatory diagram illustrating the construction of a device for the detection of the center of rotation of a rotating object, involved in yet another embodiment of the present invention.
Figures 17, 18:
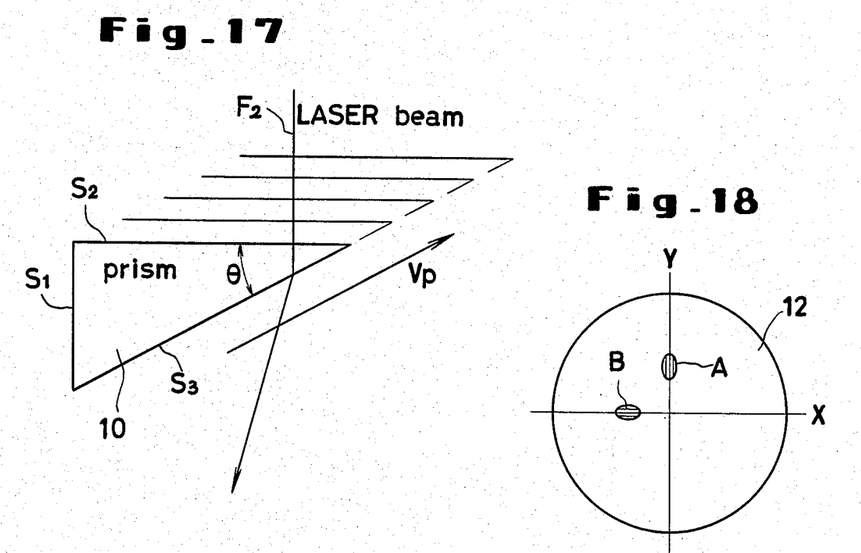
FIG. 17 is an explanatory diagram illustrating a frequency shift mechanism based on the movement of a prism.
FIG. 18 is an explanatory diagram illustrating the positions for the formation of interference fringes.

The basic construction of this embodiment is identical to that of the embodiment of FIG. 1, except that a wedge-shaped prism 10 is placed in the optical path for one of the two laser beams. The prism 10 used in this embodiment is intended for permitting frequency modulation of one laser beam $F_2$. In other words, the prism may be substituted by any desired means capable of providing required frequency modulation of the laser beam $F_2$. The prism 10 used in this embodiment, as illustrated in FIG. 17, has a cross section of the shape of a wedge containing two perpendicularly intersecting surfaces $S_1$, $S_2$ and a diagonal surface $S_3$ forming an angle $\theta$ with the surface $S_2$. The prism may be formed of BK7. This prism 10 is disposed so that the surface $S_2$ falls perpendicularly to the incident beam $F_2$ and it is adapted so as to be moved on a movable rack (not shown) in a direction parallel to the surface $S_3$ as denoted by arrow $V_p$. The beam $F_2$ has the length of its optical path varied and, consequently, the phase relation between the beams $F_1$ and $F_2$ is varied. The phase is continuously varied by moving the prism 10 in a direction parallel to the surface $S_3$. As a result, there arises a difference in the frequencies of the two beams $F_1$, $F_2$. In this case, there are satisfied the following equations.

$$\Delta f_0 = (1-n) \cdot Vd/\lambda$$

$$Vd = V_p \cdot \sin\theta$$

wherein, $\Delta f_0$ denotes the difference of frequencies of the two beams $F_1$, $F_2$, n the refractive index of the prism 10, Vd the rate of increase in thickness of the prism 10, and $V_p$ the rate of movement of the prism 10. Thus, there arises the difference, $\Delta f_0$, between the frequencies of the beams $F_1$, $F_2$. In this case, the Doppler beat frequency f on the two-beam differential type laser Doppler velocimeter and the velocity of rotation of the surface 12 of the object under test are represented as follows.

$$f = 2\sin\beta \cdot f_0 \cdot V/C - \Delta f_0$$

wherein, C denotes the speed of light.

Figure 4:
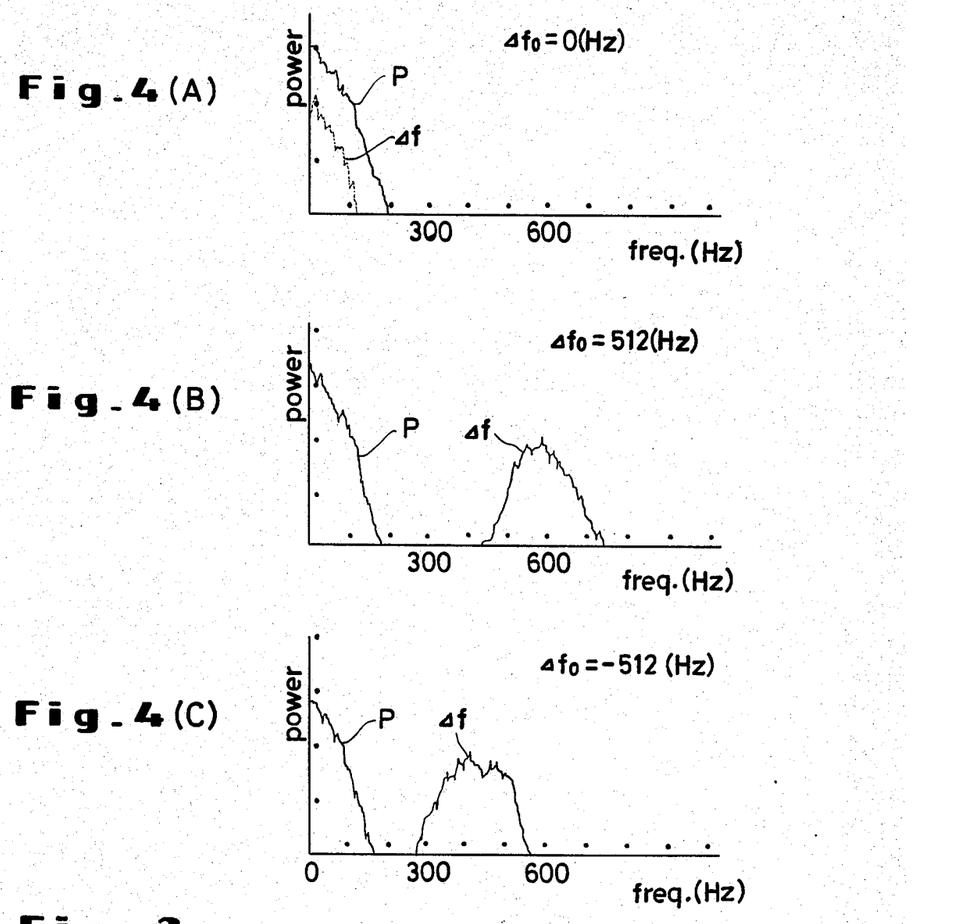
FIGS. 4(A), 4(B), and 4(C) are power spectrum diagrams obtained in model tests of the detection of the center of rotation of a rotating object according to the present invention.

Owing to the frequency modulation which is caused by the incorporation of the prism adapted to be moved in the optical path of one of the pair of beams, the Doppler frequency $\Delta f$ can be separated and clearly discriminated from the resultant pedestal component P in the resultant power spectrum as illustrated in FIG. 4(B) and FIG. 4(C). The movement of the prism causes a proportional movement of the interference fringe. FIG. 4(B) depicts a case wherein the direction of the movement of the interference fringe is reversed to the direction of rotation and FIG. 4(C) depicts a case wherein the direction of the movement of the interference fringe coincides with the direction of rotation.

In the procedure of detection illustrated in FIG. 3, the measurement of the interference fringes may be carried out as illustrated in FIG. 18 where the measurement of the interference fringes at a plurality of points in the X and Y directions on the surface 12 of the object under test is desired to be simplified. For this purpose, the interference fringe generating unit is so constructed that two interference fringes may be produced one each at points A and B on the X, Y coordinate axes on the surface 12 of the object under test. When the two interference fringes are simultaneously formed at the points A and B on the surface 12 of the object under test as described above, the center of rotation of the surface 12 of the object can be determined by measuring these interference fringes at A and B, and seeking out the point at which the velocities of the point B on the X axis and the point A on the Y axis are equalized to the velocity corresponding to the frequency shifted by the prism. Further, the plus or minus (sign) of the direction of the rotation can be determined by finding whether the frequency of the Doppler beat signal obtained has shifted in the increasing direction or the decreasing direction from the position of the frequency shifted by the prism. The center of rotation can be found by calculation to be performed on the position of the detection, the velocity and direction of the rotation. On the assumption that V stands for the velocity and $\omega$ for the angular speed of rotation of the surface, the distance r from the position of detection to the center of rotation can be expressed as $r = V/\omega$. In consequence of the detection of the points A and B, the distances of the points A and B in the direction of Y axis and X axis can be found from the aforementioned formula of r and the direction can be found from the sign of the velocity. For this operation, the angular velocity ω of rotation of the surface must be measured in advance at a position amply separated from the center of rotation. (In the case where the detection of the center of rotation is sought on the order of microns as in the present invention, a distance of a centimeter ought to suffice for this separation of the position of measurement from the center of rotation.) This method has a salient advantage that no movement of a device for measurement is required.

Figure 19:
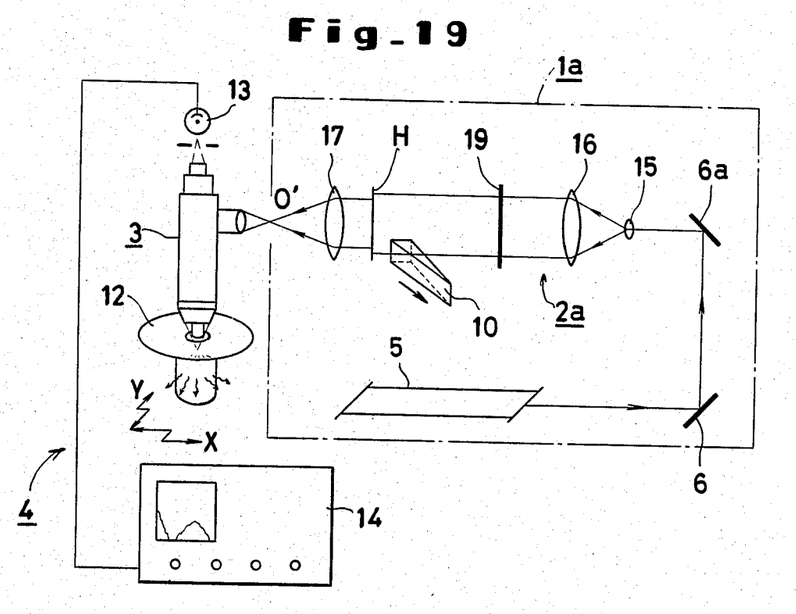
FIG. 19 is an explanatory diagram illustrating the construction of a device for the detection of the center of rotation of a rotating object, involved in a further embodiment of the present invention.

For the formation of these interference fringes at the points A and B, one laser beam must be split into as many beams as required by the measurement and this splitting of one laser beam calls for a multi-beam splitter. This multi-beam splitter can be formed with a hologram obtained by multiple exposure. The adoption of the hologram as a multi-beam splitter simplifies the construction of the interference fringe generating unit for the laser Doppler effect. FIG. 19 illustrates a device for the detection of the center of rotation involving still another embodiment of this invention. In this device for the detection of the center of rotation, the interference fringe generator unit 1a is composed of a laser 5 and an optical system which, as enumerated in the order falling in the direction of the laser beam emanating from the laser 5, consists of a mirror 6, a mirror 6a, lenses 15, 16, an open filter 19, a hologram H, and a lens 17. The lenses 15, 16 cooperate to serve as a beam expander. By these lenses, a laser beam is expanded into parallel beams, which impinge upon the filter 19 having four openings. Consequently, a total of four beams are allowed to illuminate the hologram H. In this construction, one prism 10 is inserted in one of the four beams thus obtained. A plurality of object beams are reconstructed by the hologram H, passed through the lens 17, and converged at the focal point O' to produce an interference fringe.

Figure 20A:
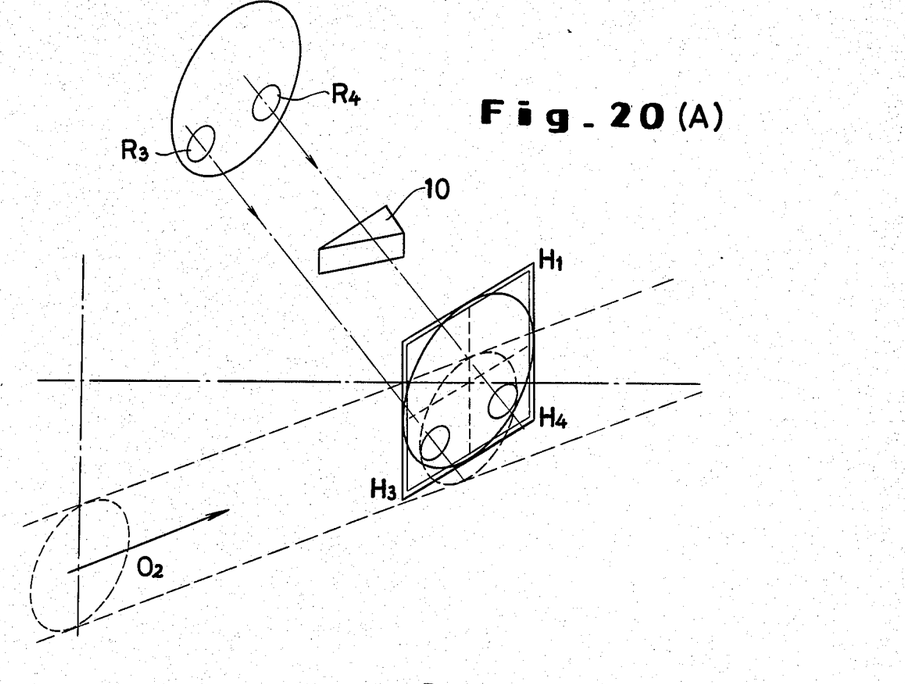
FIGS. 20(A) and 20(B) are explanatory diagrams each illustrating a procedure for the preparation of a multiple exposure hologram to be used in the device of FIG. 19.
Figure 20B:
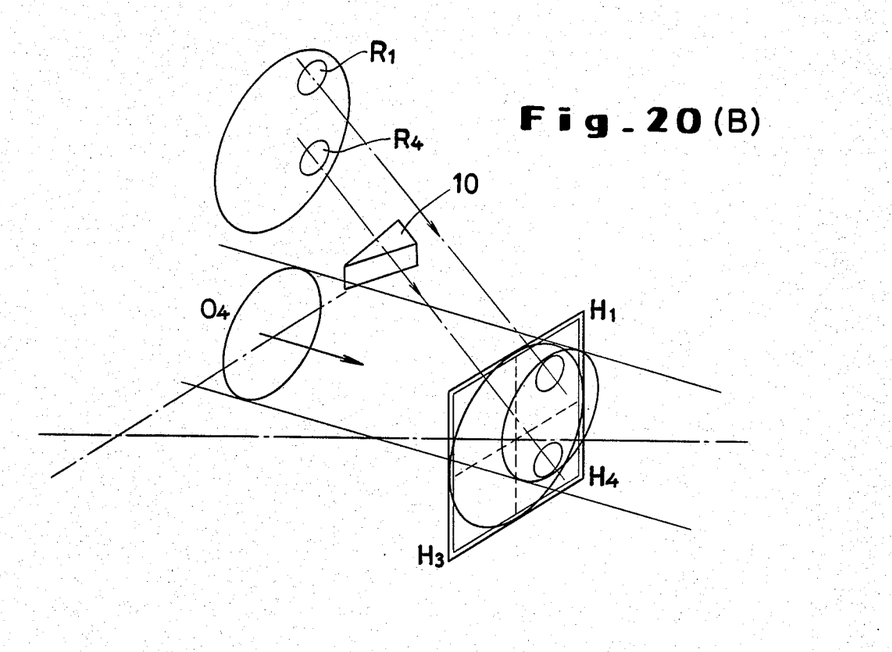

The preparation of the hologram H which functions as a multi-beam splitter can be effected as follows. As illustrated in FIG. 20(A) and FIG. 20(B), two object beams $O_2$, $O_4$ each formed of parallel beams are recorded on the hologram H by the use of three reference beams $R_1$, $R_3$, and $R_4$. In this case, the hologram is divided into small regions, which are used for recording different object beams. The procedure involved herein for the preparation of the hologram H is basically similar to that of FIG. 8(A) and FIG. 8(B). The division of the hologram into the small regions is for preventing otherwise possible decline of contrast and occurrence of unnecessary mutual interference of the individual beams. The procedure is as follows.

(1) First, the object beam $O_2$ is recorded in the regions $H_3$, $H_4$ by means of the reference beam $R_3$, $R_4$. In this case, the prism 10 is inserted in the optical path for the reference beam $R_4$ (FIG. 20(A)).

(2) Then, the central beam of the object beam $O_4$ is aligned in a plane which is perpendicular to the plane including the central beam of the object beam $O_2$ as illustrated in FIG. 20(B).

(3) Similarly, the object beam $O_4$ is recorded in the regions $H_1$, $H_4$ by means of the reference beams $R_1$, $R_4$.

By this procedure, the region $H_1$ records the object beam $O_4$, the region $H_3$ the object beam $O_2$, and the region $H_4$ the object beams $O_2$ and $O_4$, respectively. The reconstruction of these object beams is accomplished by illuminating on the hologram H a reference beam which embraces all the reference beams $R_1$, $R_3$ and $R_4$. Consequently, the object beams $O_2$, $O_4$ are reconstructed from the portions forming the hologram H. In this case, the prism 10 is inserted only in the optical path for the reference beam $R_4$. Since one object beam is recorded in the hologram by two reference beams as described above, each object beam is reconstructed in the form of two parallel beams. This means that a total of two pairs of two-parallel beams are reconstructed in the device of the construction described.

The lens 17 placed behind the hologram H enables each pair of parallel beams to converge on one point at the focal point, giving rise to an interference fringe. Since there are two pairs of beams, there will be formed a total of two interference fringes.

Figure 13:
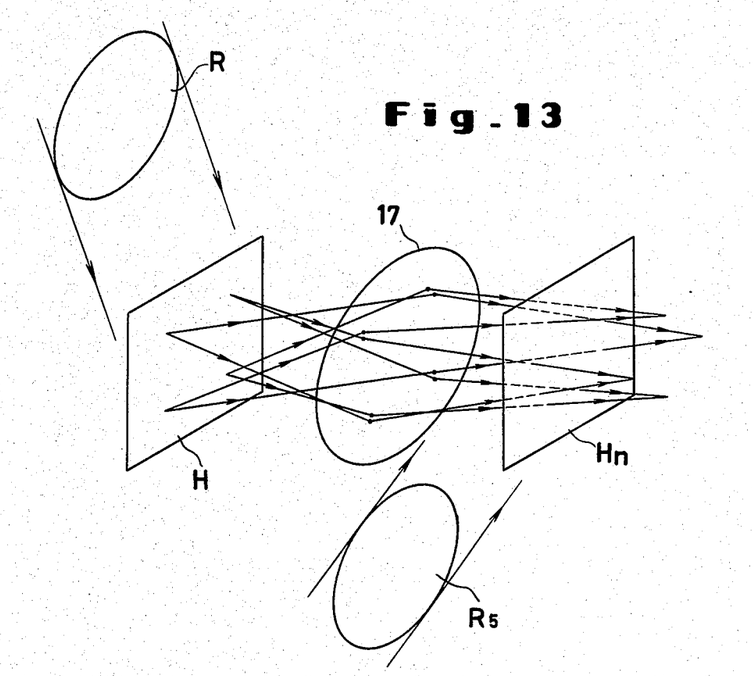
Figures 21A, 21B:
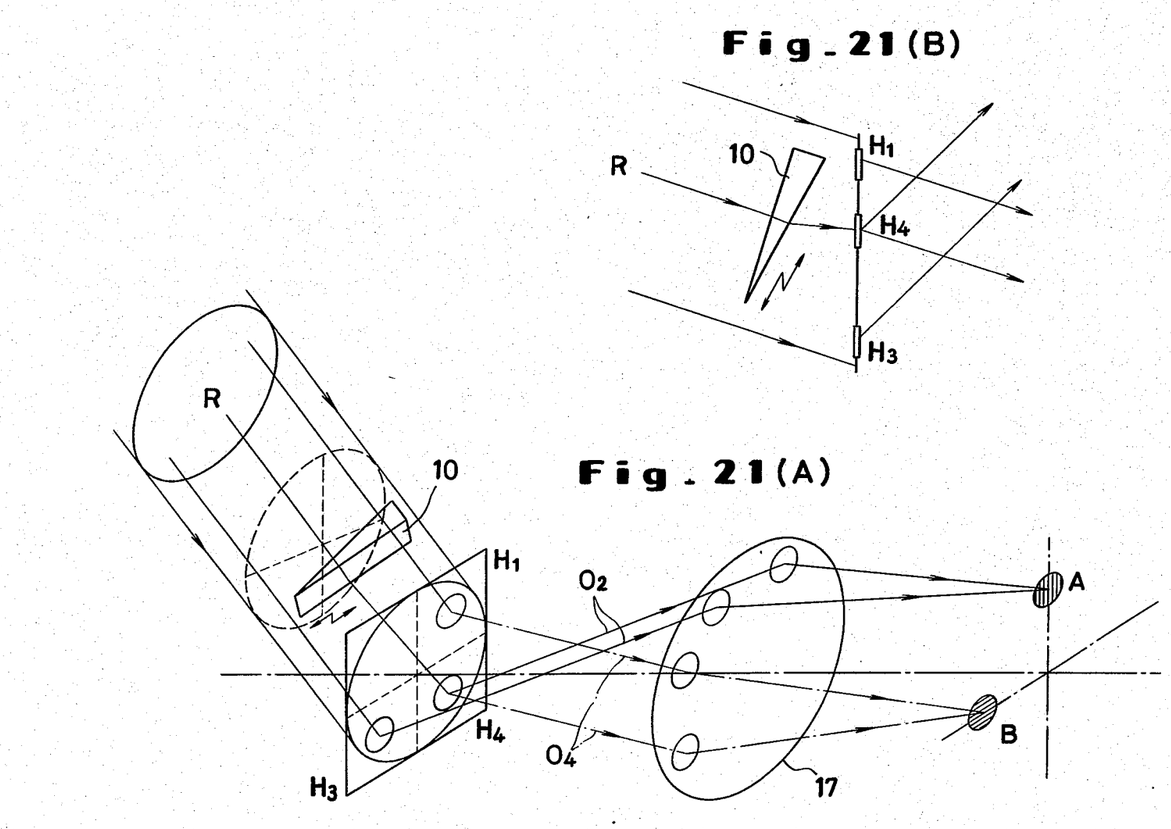
FIGS. 21(A) and 21(B) are respectively a perspective view and a explanatory plane view illustrating a procedure for the reconstruction of a multiple exposure hologram.

Optionally, the lens 17 may be omitted by recording the action of the lens 17 on the hologram at the same time that the object beams are recorded. In this case, the procedure for the preparation of the hologram H is similar to that of FIG. 13. The recording of the object beams on the hologram H is effected behind the lens 17 as seen in FIG. 21(A). The hologram H' which is consequently obtained is used in place of the hologram H. Otherwise, the object beams reconstructed by the hologram H may be passed through the lens 17 and recorded on the hologram H' by means of other reference beams. The hologram H' thus obtained is used in place of the hologram H.

Figure 22A:
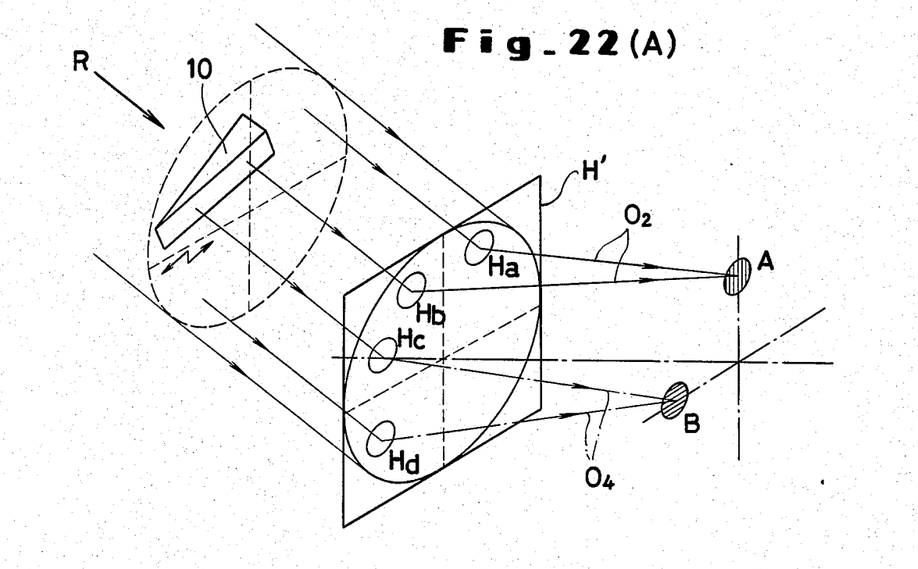
FIGS. 22(A) and 22(B) are respectively a perspective view and a explanatory plane view illustrating a procedure for the reconstruction of a hologram recorded inclusive of a lens effect.
Figure 22B:
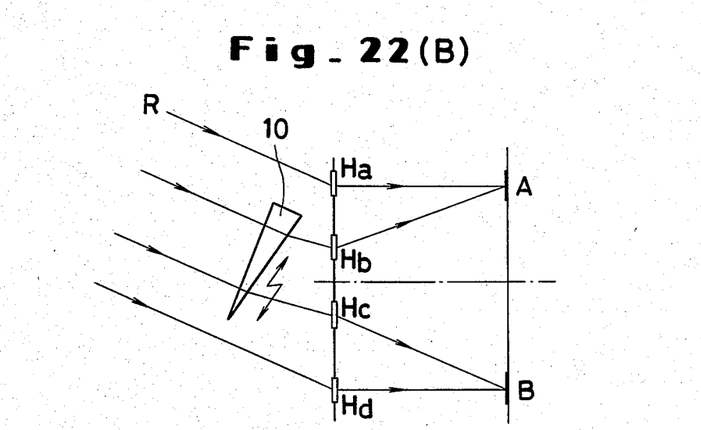

The reconstruction of the object beams from the hologram H is accomplished by illuminating on the hologram H a reference beam R which embraces the reference beams $R_1$, $R_3$, and $R_4$ as illustrated in FIG. 22(A) and FIG. 22(B). Consequently, the object beams $O_2$, $O_4$ are reconstructed from the portions forming the hologram H'.

In accordance with this invention, there is obtained a device which permits the center of rotation on the surface of a rotating object under test to be easily detected with high accuracy and which provides easy discrimination between the pedestal component and the signal component even when the rotational velocity of the surface of the rotating object is low.

Obviously, many modifications and variations of the present invention are possible in light of the above teachings. It is therefore to be understood that within the scope of the appended claims, the present invention may be practiced otherwise than as specifically described herein.

What is claimed is:

1. A device for the determination of the center of rotation of a rotating object, which comprises:
an interference fringe generating unit composed of a laser and an optical system for generating fours pairs of laser beams, focussing said four pairs of laser beams at four focal points, and consequently forming interference fringes at said four focal points by using said four pairs of laser beams,
a microscope for focussing said interference fringes produced in said interference fringe generating unit upon said rotating object under test and allowing the reflected light scattered by said rotating object under test to be discharged as output signals through an eyepiece thereof, and
an interference fringe measuring unit composed of a photoelectric element for receiving said scattered light discharged through said eyepiece of said microscope and converting said optical signals of said scattered light into corresponding electrical signals, and a spectrum analyzer for analyzing said electrical signals received from said photoelectric element and producing corresponding power spectrums, whereby the center of rotation of said rotating object is determined on the basis of velocity values derived from said power spectrums produced by said spectrum analyzer from said electrical signals generated from said interference fringes focussed upon said rotating object.

2. A device according to claim 1, wherein said formation of the interference fringes is effected by incorporating in said optical system of said interference fringe generating unit a hologram obtained by multiple exposure to four reference beams and two object beams, reconstructing four pairs of object beams by illuminating on said hologram one reference beam equivalent to said four reference beams, and focussing said four pairs of object beams through a lens at respective focal points.

3. A device according to claim 1, wherein said formation of the interference fringes is effected by incorporating in said optical system of said interference fringe generating unit a hologram obtained by recording, in conjunction with reference beams, said four pairs of laser beams ready to be illuminated through a lens at respective focal points for the formation of four interference fringes, illuminating said reference beams on said hologram thereby reconstructing object beams, and focussing said reconstructed object beams at respective focal points.

4. A device according to claim 1, wherein said formation of the interference fringes at four respective focal points is effected by incorporating in said optical system of said interference fringe generating unit a second hologram obtained by illuminating a second reference beam equivalent to said reference beams on a first hologram resulting from multiple exposure to four reference beams and two object beams, passing the resultant reconstructed object beams through a lens, and recording the reconstructed object beams emanating from said lens in conjunction with a third reference beam, and projecting on said second hologram a reference beam equivalent to a third reference beam.

5. A device according to claim 1, wherein a prism is set in the optical path of one of said laser beams in said interference fringe generating unit, disposed so that the surface thereof exposed to the incident laser beam falls perpendicularly to the optical path of the incident laser beam, and translated along a plane inclined to said base exposed to the incident laser beam so as to effect frequency modulation of said one laser beam.

6. A device according to claim 1, wherein prisms are set one each in the optical paths for laser beams on one side of each of two pairs of laser beams, disposed so that the surfaces thereof fall perpendicularly to the optical path of the incident laser beams, and translated along planes inclined to said surfaces exposed to the incident laser beams so as to effect frequency modulation of said laser beams on one side of each of said pairs of laser beams and, at the same time, produce interference fringes at two positions on the rotating object under test.

7. A device according to claim 6, wherein said formation of the interference fringes is effected by incorporating in said optical system of said interference fringe generating unit a hologram obtained by multiple exposure to two pairs of reference beams sharing one reference beam and two object beams, illuminating on said hologram a reference beam equivalent to said two pairs of reference beams thereby reconstructing two pairs of object beams for forming interference fringes one each at two positions on the rotating object under test, and focussing said two pairs of object beams through a lens at the focal points.

8. A device according to claim 6, wherein said formation of the interference fringes is effected by incorporating in said optical system of said interference fringe generating unit a hologram obtained by recording, in conjunction with reference beams, two pairs of laser beams, ready to form two interference fringes through a lens, illuminating on said hologram a reference beam equivalent to said reference beams thereby reconstructing object beams, and focussing said object beams on focal points for thereby producing interference fringes.

9. Apparatus for the determination of the center of rotation of a rotating object, comprising:
a source of light;
means for generating a plurality of interference fringe patterns from said source of light;
means for focussing said plurality of interference fringe patterns upon said rotating object under test and for allowing the reflected light scattered from said rotating object under test to be discharged as optical output signals;
photoelectric means for receiving said scattered light optical output signals and converting said optical output signals into corresponding electrical signals; and
means for analyzing said electrical signals from said photoelectric means and for producing power spectrums therefrom,
whereby said center of rotation of said rotating object is determined from the velocity values derived from said power spectrums produced from said analysis of said electrical signals generated from said interference fringe patterns focussed upon said rotating object.

10. Apparatus as set forth in claim 9, wherein:
said source of light comprises a laser.

11. Apparatus as set forth claim 9, wherein:
said means for generating said fringe patterns comprises beam splitting means.

12. Apparatus as set forth in claim 11, wherein:
said beam splitting means comprises a hologram.

13. Apparatus as set forth in claim 9, wherein:
said means for focussing said fringe patterns upon said rotating object comprises a microscope.

14. Apparatus as set forth in claim 9, wherein:
four interference fringe patterns are generated from said source of light.

15. Apparatus as set forth in claim 9, wherein:
said analyzing means comprises a spectrum analyzer.

16. A method for determining the center of rotation of a rotating object, comprising the steps of:
providing a source of light;
generating at least one interference fringe pattern from said source of light;
focussing said at least one interference fringe pattern at a plurality of point locations within the plane of rotation of said rotating object under test;
discharging the reflected light scattered from each of said point locations as optical output signals;
converting said optical output signals into corresponding electrical signals; and producing power spectrums from said electrical signals, whereby said center of rotation of said rotating object is determined from velocity values derived from said power spectrums produced from said electrical signals generated from said interference fringe patterns focussed at said plurality of point locations within the plane of rotation of said rotating object under test.

17. A method as set forth in claim 16, wherein:
said point locations are freely selected point locations.

18. A method as set forth in claim 16, wherein:
said interference fringe pattern is focussed at four point locations.

19. A method as set forth in claim 18, wherein:
said interference fringe pattern is sequentially focussed at said four point locations.

20. A method as set forth in claim 16, wherein:
four interference fringe patterns are generated from said source of light; and
said four interference fringe patterns are simultaneously focussed at said point locations.

21. A method as set forth in claim 16, wherein:
said source of light comprises a laser.

* * * * *